United States Patent [19]

Halm

[11] Patent Number: 5,212,210
[45] Date of Patent: May 18, 1993

[54] ENERGY CURABLE COMPOSITIONS HAVING IMPROVED CURE SPEEDS

[75] Inventor: Leo W. Halm, Blaine, Minn.

[73] Assignee: Minnesota Mining and Manufacturing Company, St. Paul, Minn.

[21] Appl. No.: 853,570

[22] Filed: Mar. 18, 1992

[51] Int. Cl.$^5$ ............................................. C08G 18/22
[52] U.S. Cl. ..................................... 522/24; 522/12; 522/29; 522/174; 528/50; 427/517
[58] Field of Search ..................... 522/174, 12, 24, 29; 521/50.5, 99; 528/50; 427/44

[56] References Cited

U.S. PATENT DOCUMENTS

| | | | |
|---|---|---|---|
| 4,284,731 | 8/1981 | Moser et al. | 528/50 |
| 4,342,793 | 8/1982 | Skinner et al. | 427/44 |
| 4,521,545 | 6/1985 | Kerimis et al. | 521/107 |
| 4,544,466 | 10/1985 | Lindstrom | 204/159.11 |
| 4,549,945 | 10/1985 | Lindstrom | 204/159.11 |
| 4,582,861 | 4/1986 | Galla et al. | 521/118 |
| 4,740,577 | 4/1988 | De Voe et al. | 521/50.5 |
| 4,861,806 | 8/1989 | Rembold et al. | 522/66 |
| 4,950,696 | 8/1990 | Palazzotto et al. | 522/25 |
| 4,952,612 | 8/1990 | Brown-Wensley et al. | 522/25 |
| 4,985,340 | 1/1991 | Palazzotto et al. | 430/270 |
| 5,059,701 | 10/1991 | Keipert | 556/13 |
| 5,073,476 | 12/1991 | Meier et al. | 522/24 |
| 5,089,536 | 2/1992 | Palazzotto et al. | 522/16 |
| 5,091,439 | 2/1992 | Berner et al. | 522/26 |
| 5,102,924 | 4/1992 | Williams et al. | 522/4 |

FOREIGN PATENT DOCUMENTS

| | | |
|---|---|---|
| 38551/85 | 8/1988 | Australia . |
| 28686 | 5/1981 | European Pat. Off. . |
| 094914 | 9/1986 | European Pat. Off. . |
| 094915 | 1/1987 | European Pat. Off. . |
| 344911 | 12/1989 | European Pat. Off. . |
| WO88/02879 | 4/1988 | World Int. Prop. O. . |

OTHER PUBLICATIONS

Speckhard et al., *J. Appl. Polymer Science*, 30, 647–666 (1985).

C. Bluestein, *Polym.-Plast. Technol. Eng.*, 17(1), 83–93 (1981).

*Primary Examiner*—Maurice J. Welsh
*Assistant Examiner*—Rachel Johnson
*Attorney, Agent, or Firm*—Gary L. Griswold; Walter N. Kirn; Lorraine R. Sherman

[57] ABSTRACT

A composition and method provide improved physical properties and cure speed of polyurethane precursors, with or without free radical polymerizable monomers or oligomers present, by use of a two component catalyst system. The resin blend can be activated with a latent organometallic catalyst combined with an organic peroxide which can be a hydroperoxide or an acyl peroxide to decrease the cure time while increasing the break energy and tangent modulus of the system.

26 Claims, 2 Drawing Sheets

ENERGY CURABLE COMPOSITIONS HAVING IMPROVED CURE SPEEDS

The United States government has certain rights in this invention pursuant to Contract No. DE-AC78'8ID12692, entitled "Industrial Gaseous Waste Reduction Phase II" awarded by the United States Department of Energy.

FIELD OF THE INVENTION

This invention relates to energy curable compositions comprising urethane precursors and a bicomponent curing agent. In another aspect, it relates to an enhancement of cure speed of polyurethane precursors and performance properties of the resulting polymer. The compositions may be used in, but are not limited to, the following applications: abrasion resistant coatings, protective finishes, pressure sensitive adhesives, structural adhesives, coil coatings, vehicular transportation coatings, automotive refinish coatings, inks, and other applications requiring high solids, low volatile organic compound (VOC) formulations.

BACKGROUND OF THE INVENTION

Various polymeric coatings and articles are produced in processes involving the use of organic solvents. There is an intense effort by law makers, researchers, and industry to promote high and 100% solids formulations to reduce or eliminate the use of such solvents and the attendant costs and environmental contamination. These processes require a latent catalyst or latent reaction promoter which can be activated in a controlled fashion.

Curing of polyurethane precursors using reaction promoters such as tin salts or tertiary amines is known in the art. Curing of polymerizable mixtures of polyisocyanates with polyols (referred to as polyurethane precursors) using latent catalysts is known in the art (see for example U.S. Pat. Nos. 4,521,545, and 4,582,861).

Photocuring of urethane (meth)acrylates is well known (see T. A. Speckhard, K. K. S. Hwang, S. B. Lin, S. Y. Tsay, M. Koshiba, Y. S. Ding, S. L. Cooper *J. Appl. Polymer Science* 1985,30, 647–666. C. Bluestein Polym.-Plast. Technol. Eng. 1981,17 83–93). Photocuring of polyurethane precursors using diazonium salts, tertiary amine precursors, or organotin compounds is also known (see U.S. Pat. Nos. 4,544,466, 4,549,945, and EP No. 28,696, Derwent abstract). All of these methods suffer from one or more of the following disadvantages: sensitivity to oxygen, requirement of ultraviolet and/or high intensity light, need for modified resins, loss or dilution of urethane properties, low activity, excessive cure time, poor solubility, and poor potlife.

The photocure of urethane prepolymers using a latent organometallic salt as catalyst is described in U.S. Pat. No. 4,740,577 and U.S. Pat. No. 5,091,439. Energy polymerizable compositions comprising, for example, an ethylenically-unsaturated monomer and polyurethane precursors and as a curing agent, a latent organometallic salt, has been disclosed in EP 344,911. Polyisocyanate coatings are disclosed to be cured in the presence of a ferrocenium compound in U.S. Pat. No. 4,861,806.

An ethylenically unsaturated monomer in combination with polyurethane precursors or cationically polymerizable monomers have been disclosed in U.S. Pat. No. 4,950,696 to be cured by an organometallic compound with an onium salt.

U.S. Pat. No. 4,342,793 teaches curable compositions containing polyurethane precurosrs and free radically polymerizable compounds, using, for example, tin salts, tin compounds, or tertiary amines to cure the polyurethane precursors, and organic peroxides (including hydroperoxides, per acids, per esters, and dialkyl peroxides), azo compounds, or free radical initiators such as benzoin, benzoin ethers, Michler's ketone, or chlorinated polyaromatic hydrocarbons to cure the free radically polymerizable compounds. Use of organometallic salts with hydroperoxides or acyl peroxides to cure polyurethane precursors with or without ethylenically unsaturated compounds is not taught.

International Patent document WO 88/02879 Loctite Corporation describes the use of a free radical polymerization initiator with a $\pi$-arene metal complex to cure a free radically polymerizable monomeric material The free radically polymerizable material is further described as one or more monomers and/or prepolymers containing acrylate or methacrylate groups; or a copolymerizable monomer combination based on a polythiol and a polyene. The free radical polymerization initiator is specified as being most suitably, benzoyl peroxide, cumene hydroperoxide, methyl ethyl ketone peroxide and the like. This reference does not disclose urethane precursors as polymerizable materials.

Australian Pat. Document 38551/85 relates to a hardenable composition consisting of a) a material polymerizable by cationic or free radical polymerization, b) an iron(II)-$\eta^6$-benzene-$\eta^5$-cyclopentadienyl complex salt, c) a sensitizer for the compounds b), and d) an electron acceptor as an oxidizing agent for the material polymerizable by free radical polymerization, wherein the oxidizing agent is a hydroperoxide.

U.S. Pat. No. 4,985,340 describes an energy polymerizable composition that includes, for example, urethane precursors that may or may not be combined with ethylenically-unsaturated monomers and use as curing agent a combination of an organometallic salt and an onium salt. The use of peroxide as a free radical source is not taught.

Organometallic complex cations have been described (see European Patent Nos. 094,915 (1983) (Derwent Abstract); and 094,914 (1983) (Derwent Abstract); and U.S. Pat. No. 5,089,536. Energy polymerizable compositions comprising ionic salts of organometallic complex cations and cationically sensitive materials and the curing thereof has been taught.

Recently discovered preparations of cyclopentadienyliron(II)arenes have been disclosed in U.S. Pat. No 5,059,701.

Use of an organometallic salt or diazonium salt with a free-radical photoinitiator which can be a peroxide to sequentially cure an energy polymerizable composition consisting of one or more free-radically polymerizable monomers and polyurethane precursors is described in U.S. Ser. No. 07/568,088 (1990). Use of an organometallic salt with a free-radical photoinitiator, which can be a peroxide, in a similar composition and similar method is disclosed in U.S. Ser. No. 07/578,022 to be a pressure-sensitive adhesive These applications do not teach the use of an organometallic salt with a specific peroxide to cure polyurethane precursors with or without ethylenically unsaturated monomers.

SUMMARY OF THE INVENTION

Briefly, the present invention provides a photopolymerizable composition comprising polyurethane precursors and optionally an ethylenically unsaturated monomer and as a bicomponent curing agent 1) an ionic salt of an organometallic complex cation, and 2) a peroxide selected from the group consisting of hydroperoxides and acyl peroxides. Preferably, the peroxide has the formula

I wherein $R^1$ and $R^2$ independently represent hydrogen or an organic group selected from the class consisting of (1) straight chain or branched aliphatic hydrocarbon groups containing 1 to 50 carbon atoms and zero to 20 heteroatoms, (2) cycloaliphatic hydrocarbon groups containing 2 to 50 carbon atoms and zero to 20 heteroatoms, (3) aromatic hydrocarbon groups or heterocyclic aromatic groups containing 3 to 15 carbon atoms and zero to 10 heteroatoms, (4) araliphatic hydrocarbon groups containing 6 to 50 carbon atoms and zero to 20 heteroatoms, or (5) alkoxy groups having 1 to 50 carbon atoms and zero to 20 heteroatoms. The heteroatoms that can be present in $R^1$ and $R^2$ can be those that do not interfere with the overall efficacy of the composition and include peroxidic oxygen, non-peroxidic oxygen, sulfur, nitrogen which preferably is non-amino nitrogen, halogen, silicon, and non-phosphino phosphorus, m and n independently can be 0 or 1, and w is an integer in the range of 1–4, with the provisos that when both $R^1$ and $R^2$ are an organic group (i.e., not hydrogen), then $m+n$ is equal to 1 or 2, and when $R^1$ is alkoxy, $m=1$, and when $R^2$ is alkoxy, $n=1$.

In another aspect, the present invention provides a method for increasing the cure speed of polyurethane precursors, which preferably are polyisocyanates and polyols, by the use of the above-described bicomponent curing agent.

The advance in the current art is the use of peroxides described above, preferably having the formula disclosed above with organometallic complex salts for the energy induced curing of urethane precursors, optionally in the presence of ethylenically-unsaturated monomers.

Advantages of energy curable compositions of the present invention include:

1) attaining a reduction of tack free times of at least 25 percent of that required without the specified peroxide, and a reduction of about 50 percent of that required when using dialkyl peroxides;

2) achieving an increase in energy to break of at least 50 percent and an increase in tangent modulus during tensile testing of cured mixtures of ethylenically-unsaturated monomers and polyurethane precursors made using the method of the present invention compared to the same polymer precursor compositions prepared using organometallic salts and prior art free radical initiators as curatives;

3) using radiation processing, particularly utilizing electron beam and photogenerated catalysts, which has potential capability for penetrating and polymerizing thick and pigmented coatings; and 4) allowing use of more readily available monomers in place of functionalized oligomers (used in prior art) thereby resulting in lower viscosity monomer solutions which are easier to coat than more viscous oligomer solutions.

In this application:

"hydroperoxide" means a peroxide containing the —OOH group (e.g., HOOH, $CH_3OOH$, $C_2H_5OOH$, etc.);

"acyl peroxide" means a peroxide containing the group

"energy-induced curing" means curing using electromagnetic radiation (ultraviolet and visible), accelerated particles (including electron beam), and thermal (infrared and heat) means;

"ethylenically-unsaturated monomer" means those monomers that polymerize by a free-radical mechanism;

"catalytically-effective amount" means a quantity sufficient to effect polymerization of the curable composition to a polymerized product at least to a degree to cause an increase in the viscosity of the composition;

"organometallic compound" means a chemical substance in which at least one carbon atom of an organic group is bonded to a metal atom ("Basic Inorganic Chemistry", F. A. Cotton, G. Wilkinson, Wiley, New York, 1976, p 497);

"metal" means any transition metal from Periodic Groups 4–10;

"group" means a chemical species that allows for substitution or which may be substituted by conventional substituents which do not interfere with the desired product, e.g., substituents can be alkoxy, phenyl, halo (F, Cl, Br, I), cyano, nitro, etc.;

"polyurethane precursors" means a mixture of one or more monomers of the type including diisocyanates and polyisocyanates, and one or more compounds bearing at least two isocyanate-reactive hydrogen atoms; the ratio of isocyanate groups to isocyanate-reactive hydrogen atoms is in the range of 1:2 to 2:1; preferred compounds bearing isocyanate reactive hydrogen atoms are polyols;

"polyisocyanate" means an aliphatic or aromatic isocyanate having 2 or more isocyanate groups;

"polyol" means an aliphatic or aromatic compound containing 2 or more hydroxyl groups;

"bridging ligand" means a ligand that bonds to two or more metals in the presence or absence of metal-metal bonds;

"bireactive monomer" means those monomers which contain both at least one free-radically polymerizable group and at least one isocyanate or isocyanate-reactive group;

"(meth)acrylate" means at least one of acrylate and methacrylate;

"elongation to break" means percent elongation at the moment of rupture of the test specimen (ASTM 638M-87b);

"free-radically polymerizable monomer" means at least one monomer that polymerizes by a free-radical mechanism; the monomer can be monofunctional or bifunctional, or multifunctional, and includes acrylates and methacrylates, vinyl esters, vinyl aromatic compounds, allyl compounds, alkyl ether compounds, etc.;

"energy to break" means the area under a stress-strain curve taken to the break point and is expressed in Newton-meters (ASTM 638M-87b) and "tangent modulus" or "modulus of elasticity" means the slope of the tangent to the stress-strain curve at a low stress and is expressed in megapascals (ASTM 638M-87b).

DETAILED DISCLOSURE OF THE INVENTION

As noted above, the present invention provides an energy polymerizable composition comprising polyurethane precursors, a bicomponent curing agent, and optionally at least one ethylenically-unsaturated monomer.

The polyisocyanate component of the polyurethane precursors that can be cured or polymerized in compositions of the present invention may be any aliphatic, cycloaliphatic, araliphatic, aromatic, or heterocyclic polyisocyanate, or any combination of such polyisocyanates. Particularly suitable polyisocyanates correspond to the formula in which p is an integer 2 to 4, and Q represents an aliphatic hydrocarbon di-, tri-, or tetra-radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of polyisocyanates are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (see German Auslegeschrift No. 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and-/or -4,4'-diisocyanate, naphthylene-1,5-diisocyanate, and the reaction products of four equivalents of the aforementioned isocyanate-containing compounds with compounds containing two isocyanate-reactive groups.

According to the present invention, it is also possible for example, to use triphenyl methane-4,4',4"-triisocyanate, polyphenyl polymethylene polyisocyanates described in British Pat. Nos. 874,430 and 848,671, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in U.S. Pat. No. 3,152,162 and in German Offenlegungsschrift Nos. 2,504,400, 2,537,685 and 2,552,350, norbornane diisocyanates according to U.S. Pat. No. 3,492,330, polyisocyanates containing allophanate groups of the type described, for example, in British Pat. No. 994,890, in Belgian Pat. No. 761,626 and in Dutch Pat. Application No. 7,102,524, polyisocyanates containing isocyanurate groups of the type described, for example in U.S. Pat. No. 3,001,973, in German Pat. Nos. 1,022,789, 1,222,067 and 1,027,394 and German Offenlegungsschrift Nos. 1,929,034 and 2,004,048, polyisocyanates containing urethane groups of the type described, for example, in Belgian Pat. No. 752,261 or in U.S. Pat. Nos. 3,394,164 and 3,644,457, polyisocyanates containing acrylated urea groups according to German Pat. No. 1,230,778, polyisocyanates containing biuret groups of the type described, for example, in U.S. Pat. Nos. 3,124,605, 3,201,372 and 3,124,605 and in British Pat. No. 889.050, polyisocyanates produced by telomerization reactions of the type described for example in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, reaction products of the above-mentioned diisocyanates with acetals according to German Patent 1,072,385 and polyisocyanates containing polymeric fatty acid esters according to U.S. Pat. No. 3,455,883.

It is also possible to use distillation residues having isocyanate groups obtained in the commercial production of isocyanates, optionally in solution in one or more of the above-mentioned polyisocyanates. It is also possible to use any mixtures of the above-mentioned polyisocyanates.

Preferred polyisocyanates are hexamethylene diisocyanate, the biuret of hexamethylene diisocyanate and oligomers thereof (Desmodur TM N-100, Miles, Pittsburgh, Pa.), the isocyanurate of hexamethylene diisocyanate (Desmodur TM N-3300, Miles, Pittsburgh, Pa.); and 4,4'-methylenebis(cyclohexylisocyanate); 1-isocyanato-3,3,5-trimethyl-5-isocyanatomethyl cyclohexane (isophorone diisocyanate); the tolylene diisocyanates and their isocyanurates; the mixed isocyanurate of tolylene diisocyanate and hexamethylene diisocyanate; the reaction product of 1 mol of trimethylol propane and 3 mols of tolylene diisocyanate and also crude diphenyl methane diisocyanate.

Suitable compounds containing at least 2 isocyanate-reactive hydrogen atoms can be high or low molecular weight compounds, having a weight average molecular weight, generally from about 50 to 50,000. In addition to compounds containing amino groups, thiol groups or carboxyl groups, suitable compounds include, preferably, compounds containing hydroxyl groups, particularly compounds containing from about 2 to 50 hydroxyl groups and above all, compounds having a weight average molecular weight of from about 400 to 25000, preferably from about 700 to 2000. Examples of these preferred compounds are polyesters (e.g., a mixture of oligomeric polyester polyols which are commercially available (Desmophen TM, 670-100, 800, 1100, 651A-65, Miles, Pittsburgh, Pa.)), polyethers (e.g., commercially available as Carbowax ™ series such as 400, 600, 800, 1000, 20,000, Union Carbide, Danbury, Conn.), polythioethers, polyacetals, polycarbonates, poly(meth)acrylates, and polyester amides, containing at least 2, generally from about 2 to 8, but preferably from about 2 to 4 hydroxyl groups, or even hydroxyl-containing prepolymers of these compounds and a less than equivalent quantity of polyisocyanate, of the type known for the production of polyurethanes.

Representatives of the above-mentioned compounds used in accordance with the present invention are described, for example, in High Polymers, Vol. XVI, "Polyurethanes, Chemistry and Technology", By Saunders and Frisch, Interscience Publishers, New York/London, and Vol. I, 1962, pages 32 to 42 and pages 44 to 54 and Vol. II, 1964, pages 5–6 and 198–199, and in "Kunststoff-Handbuch", Vol. VII, Vieweg-Hochtlen, Carl-HanserVerlag, Munich, 1966, for example, on pages 45 to 71. It is, of course, possible to use mixtures of the above-mentioned compounds containing at least two isocyanate-reactive hydrogen atoms and having a molecular weight of from about 50 to 50,000 for example, mixtures of polyethers and polyesters.

In some cases, it is particularly advantageous to combine low-melting and high-melting polyhydroxyl containing compounds with one another (see German Offenlegungsschrift No. 2,706,297).

Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanate-reactive hydrogen atoms. It is also possible to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenylpropane and dihydroxymethylhydroquinone.

Other polyols suitable for purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (see German Offenlegungsschrift Nos. 2,639,084, 2,714,084, 2,714,104, 2,721,186, 2,738,154 and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (see German Offenlegungsschrift No. 2,638,759).

Many other compounds containing isocyanate-reactive hydrogen atoms and polyisocyanates are useful in the present invention, and are obvious to those skilled in the art of polyurethane science and technology.

Optionally present monomers useful in the present invention which are different from the above-described polyurethane precursors are ethylenically-unsaturated materials, preferably acrylate and methacrylate materials which can be monomers and/or oligomers such as (meth)acrylates, acrylic acid esters, and methacrylic acid esters. Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, stearyl acrylate, allyl acrylate, isobornyl acrylate, isobornyl methacrylate, phenoxyethyl acrylate, phenoxyethyl methacrylate, tetrahydrofurfuryl acrylate, tetrahydrofurfuryl methacrylate, cyclohexyl acrylate, cyclohexyl methacrylate, benzyl acrylate, benzyl methacrylate, ethoxyethoxyethyl acrylate, ethoxyethoxyethyl methacrylate, glycerol triacrylate, tetraethyleneglycol diacrylate, 1,4-butanediol diacrylate, ethyleneglycol diacrylate, diethyleneglycol diacrylate, triethyleneglycol dimethacrylate, 1,6-hexanediol diacrylate, 1,3-propanediol diacrylate, 1,3-propanediol dimethacrylate, trimethyolpropane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyl dimethylmethane, bis[1-(3-acryloxy-2-hydroxy)]-p-propoxyphenyl-dimethylmethane, tris-hydroxyethyl isocyanurate trimethacrylate; the bis-acrylates and bis-methacrylates of polyethylene glycols of molecular weight 200–500, copolymerizable mixtures of acrylated monomers such as those disclosed in U.S. Pat. No. 4,652,274, and acrylated oligomers such as those disclosed in U.S. Pat. No. 4,642,126.

Mixtures of mono- and polyfunctional (meth)acrylates may be used in any ratio. It is preferred that the weight ratio of monoacrylate to polyfunctional (meth)acrylates is in the range of 0.1:99.9 to 99.9:0.1, more preferably 10:90 to 90:10, and most preferably 50:50 to 80:20.

Particularly useful in preparing high performance coating compositions are the (meth)acrylates or mixtures thereof that form polymers with $T_g$'s in the −20° C. to 40° C. range, wherein $T_g$ means glass transition temperature. Of particular advantage are the (meth)acrylate monomers wherein the ester group is derived by esterification from an alcohol that contains a heteroatom in addition to the hydroxyl group of the alcohol, such heteroatom being a chemically stable linkage between two carbon atoms on either side of the linkage, forming a group which does not adversely affect the polyurethane precursor reaction. Such heteroatoms may include for example a divalent oxygen, a trivalent nitrogen, or a polyvalent sulfur, and preferably the (meth)acrylate monomers derived from an alcohol containing a divalent oxygen atom, i.e., an ether oxygen atom. Examples of such monomers are phenoxyethyl acrylate, phenoxyethyl methacrylate, tetrahydrofurfuryl acrylate, tetrahydrofurfuryl methacrylate, ethoxyethoxyethyl acrylate, ethoxyethoxyethyl methacrylate, glycerol triacrylate, tetraethyleneglycol diacrylate, 1,4-butanediol diacrylate, ethyleneglycol diacrylate, and diethyleneglycol diacrylate.

Vinyl compounds, allyl compounds, and allyl ether compounds are other types of ethylenically-unsaturated compounds useful in the present invention, such as vinyl acetate, divinyl adipate, divinyl phthalate, vinyldimethylazlactones (see U.S. Pat. No. 4,304,705), diallyl phthalate, and ethylene glycol dialkyl ether.

Another group of monomers which are useful in compositions of the invention are bireactive monomers, i.e., those that possess at least one free-radically polymerizable group and one isocyanate or isocyanate-reactive functionality. Such monomers include, for example, glycerol diacrylate, 2-isocyanatoethyl methacrylate, 3-isopropenylphenyl isocyanate, hydroxyethyl acrylate, hydroxyethyl methacrylate, hydroxypropyl methacrylate and hydroxybutyl acrylate. Bireactive monomers can comprise up to 25 mole percent of the isocyanate or isocyanate-reactive groups, preferably they comprise less than 5 mole percent of the isocyanate or isocyanate-reactive groups, and they can comprise up to 50 mole percent of free-radically polymerizable monomers, preferably less than 25 mole percent of free-radically polymerizable monomers. Preferably, the compositions are free of bireactive monomers The organometallic complex salt of the bicomponent curing agent are disclosed in detail in U.S. Pat. No. 4,740,577, col. 3, line 39 to col. 12, line 40. This patent is incorporated herein by reference The organometallic complex salt can be represented by the following general structure:

$$[((L^1)(L^2)M)_b(L^3)(L^4)]^{+e} X_f \qquad \text{III}$$

wherein M represents a metal atom selected from the elements of Periodic Groups 4 to 10, with the proviso that formula III represents an organometallic salt having a mono- or bimetallic cation;

$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none, or 1 to 6 ligands contributing an even number of sigma-electrons that can be the same or different selected from mono-, di-, and tri-dentate ligands, each donating 2, 4, or 6 sigma-electrons to the valence shell of M;

$L^3$ represents none, 1 or 2 bridging ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents none, 1, 2, or 3 bridging ligands contributing an even number of sigma-electrons that can be the same or different selected from mono-, di-, and tri-dentate ligands, each donating 2, 4 or 6 sigma-electrons to the valence shells of two metal atoms M, simultaneously; with the proviso that the total electronic charge contributed to M by the ligands $L^1$, $L^2$, $L^3$, and $L^4$ plus the product of the ionic charge on M with b results in a residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer having a value of 1 or 2, the number of anions required to neutralize the positive charge e on the cation.

In a preferred composition of the invention, the salts of the organometallic complex cation have the formula:

$$[(L^5)(L^6)M]^{+e} X_f \qquad \text{IV}$$

wherein

M represents a transition metal atom selected from elements of the Period Groups 4 to 10;

$L^5$ represents none, one or two ligands that can be the same or different, contributing pi-electrons selected from the same groups of ligands from which ligand $L^1$ of formula III is selected;

$L^6$ represents none or 1 to 6 ligands that can be the same or different, contributing an even number of sigma-electrons selected from the same group of ligands from which ligand $L^2$ of formula III is selected; with the proviso that the total electronic charge contributed to M by $L^5$ and $L^6$ plus the ionic charge on M results in a residual net positive charge of e to the complex; and e, f, and X have the same definition as given in formula III.

In most preferred photoinitiators, $L^6$ represents no ligands and M is iron.

Ligands $L^1$ to $L^6$ are well known in the art of transition metal organometallic compounds.

Ligand $L^1$ and $L^3$ of general formula III and ligand $L^5$ of general formula IV are provided by any monomeric or polymeric compound having an accessible unsaturated group, i.e., an ethylenic, group; acetylenic, —C≡C— group; or aromatic group which have accessible pi-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkylene, e.g., decalin; an aromatic hydrocarbon, e.g., anisole; an ether, e.g., tetrahydrofuran; etc. or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligands $L^1$, $L^3$ and $L^5$ are the linear and cyclic olefinic and acetylenic compounds having less than 100 carbon atoms, preferably having less than 60 carbon atoms, and from zero to 10 hetero atoms selected from nitrogen, sulfur, non-peroxidic oxygen, arsenic, phosphorus, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; eta$^3$-allyl, eta$^3$-pentenyl, norbornadiene, eta$^5$-cyclohexadienyl, eta$^6$-cycloheptatriene, eta$^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, eta$^5$-cyclopentadienyl, eta$^6$-benzene, eta$^6$-mesitylene, eta$^6$-toluene, eta$^6$-p-xylene, eta$^6$-o-xylene, eta$^6$-m-xylene, eta$^6$-cumene, eta$^6$-hexamethylbenzene, eta$^6$-fluorene, eta$^6$-naphthalene, eta$^6$-anthracene, eta$^6$-perylene, eta$^6$-chrysene, eta$^6$-pyrene, eta$^7$-cycloheptatrienyl, eta$^6$-triphenylmethane, eta$^{12}$-paracyclophane, eta$^{12}$-1,4-diphenylbutane, eta$^5$-pyrrole, eta$^5$-thiophene, eta$^5$-furan, eta$^6$-pyridine, eta$^6$-gamma-picoline, eta$^6$-quinaldine, eta$^6$-benzopyran, eta$^6$-thiochrome, eta$^6$-benzoxazine, eta$^6$-indole, eta$^6$-acridine, eta$^6$-carbazole, eta$^6$-triphenylene, eta$^6$-silabenzene, eta$^6$-arsabenzene, eta$^6$-stibabenzene, eta$^6$-2,4,6-triphenylphosphabenzene, eta$^5$-selenophene, eta$^6$-dibenzostannepine, eta$^5$-tellurophene, eta$^6$-phenothiarsine, eta$^6$-selenanthrene, eta$^6$-phenoxaphosphine, eta$^6$-phenarsazine, eta$^6$-phenatellurazine, and eta$^6$-1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of ligands $L^1$, $L^3$ and $L^5$ can be substituted by groups that do not interfere with complexing of the ligand with the metal atom or groups which do not reduce solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^2$ and $L^4$ in formula III, and $L^6$ in formula IV are provided by monodentate and polydentate compounds preferably containing up to about 30 carbon atoms and up to 10 hetero atoms selected from nitrogen, sulfur, non peroxidic oxygen, phosphorus, arsenic, selenium, antimony, and tellurium, upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., NO+); compounds of Group 15 elements such as ammonia, phosphine, trimethylamine, trimethylphosphine, triphenylamine, triphenylphosphine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolylborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, CN$^-$, SCN$^-$, F$^-$, OH$^-$, Cl$^-$, Br$^-$, I$^-$, and H$^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

M can be any element from the Periodic Groups 4 to 10, such as, for example, Ti, Zr, Hf, V, Nb, Ta, Cr, Mo, W, Mn, Tc, Re, Fe, Ru, Os, Co, Rh, Ir, Ni, Pd and Pt. In the preferred compositions, M is Co, Fe, Mn, Re, Mo or Cr. In the most preferred compositions, M is Fe.

Suitable anions, X, in formulae III and IV, of use as the counterion in the ionic salts of the organometallic complex cation in the preferred radiation-sensitive compositions of the invention, are those in which X has the formula DZ$_r$, wherein D is a metal from Groups 8 to 11 (IB to VIII) or a metal or metalloid from Groups 13–15 (IIIA to VA) of the Periodic Chart of Elements, Z is a halogen atom, a hydroxy group, a substituted phenyl group or an alkyl group and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Z, of X in formula IV, is chlorine or fluorine.

Illustrative of suitable anions are B(phenyl)$_4^-$, B(phenyl)$_3$(alkyl)$^-$, where alkyl can be ethyl, propyl, butyl, hexyl and the like, BF$_4^-$, PF$_6^-$, AsF$_6^-$, SbF$_6^-$, FeCl$_4^-$, SnCl$_5^-$, SbF$_5^-$, AlF$_6^-$, GaCl$_4^-$, InF$_4^-$, TiF$_6^-$, ZrF$_6^-$, etc. Preferably, the anions are BF$_4^-$, PF$_6^-$, SbF$_6^-$, SbF$_5$OH$^-$, AsF$_6^-$, and SbCl$_6^-$.

Additional suitable anions, X, in formulae III and IV, of use as the counterion in the ionic salts of the organometallic complex cations include those in which X is an organic sulfonate. Illustrative of suitable sulfonate-containing anions are CH$_3$SO$_3^-$, CF$_3$SO$_3^-$, C$_6$H$_5$SO$_3^-$, p-toluenesulfonate, p-chlorobenzenesulfonate and related isomers and the like.

Organometallic salts are known in the art and can be prepared as disclosed in, for example, EPO Nos. 094,914, 094,915 and 126,712, and U.S. Pat. Nos. 5,089,536 and 5,059,701, which are incorporated herein by reference. In addition to the compounds of formulae III and IV, all of the organometallic salts disclosed in these references are useful in the present invention.

The preferred salts of organometallic complex cations useful in the compositions of the invention are derived from formula IV where L$^5$ is taken from the class of substituted and unsubstituted aromatic compounds based on a benzene or cyclopentadienyl nucleus, L$^6$ is none, M is Fe, e is 1 or 2 and X$_f$ is tetrafluoroborate, hexafluorophosphate, hexafluoroarsenate or hexafluoroantimonate.

Examples of preferred salts of organometallic complex cations useful in the composition of the invention include the following:

(eta$^6$-benzene)(eta$^5$-cyclopentadienyl)iron(1+) hexafluorophosphate (eta$^6$-toluene)(eta$^5$-cyclopentadienyl)iron(1+) hexafluoroantimonate (eta$^6$-cumene)(eta$^5$-cyclopentadienyl)iron(1+) hexafluorophosphate (eta$^6$-p-xylene)(eta$^5$-cyclopentadienyl)iron(1+) hexafluorophosphate [CpFeXylPF$_6$]

(eta$^6$-o-xylene)(eta$^5$-cyclopentadienyl)iron(1+) hexafluorophosphate (eta$^6$-m-xylene)(eta$^5$-cyclopentadienyl)iron(1+) hexafluorophosphate (eta$^6$-mesitylene)(eta$^5$-cyclopentadienyl)iron(1+) hexafluoroantimonate (eta$^6$-hexamethylbenzene)(eta$^5$-cyclopentadienyl)iron(1+) hexafluoroantimonate (eta$^6$-naphthalene)(eta$^5$-cyclopentadienyl)iron(1+) hexafluoroantimonate (eta$^6$-pyrene)(eta$^5$-cyclopentadienyl)iron(1+) hexafluorophosphate (eta$^6$-perylene)(eta$^5$-cyclopentadienyl)iron(1+) hexafluoroantimonate (eta$^6$-chrysene)(eta$^5$-cyclopentadienyl)iron(1+) hexafluorophosphate (eta$^6$-acetophenone)(eta$^5$-methylcyclopentadienyl)iron(1+) hexafluoroantimonate (eta$^6$-fluorene)(eta$^5$-cyclopentadienyl)iron(1+) hexafluoroantimonate bis(eta$^6$-mesitylene)iron(2+) hexafluoroantimonate.

Examples of peroxides useful in the present invention are as follows:

Hydroperoxides hydrogen peroxide;

cumene hydroperoxide;

t-butyl hydroperoxide;

2, 5-dihydro-peroxy-2, 5-dimethylhexane;

t-amyl hydroperoxide;

cyclohexanone peroxide;

methylethyl ketone peroxide.

Diacyl peroxide

Diisononanoyl peroxide; decanoyl peroxide; succinic acid peroxide; bis(2,4-dichlorobenzoyl) peroxide; bis(p-chloro-benzoyl) peroxide;

lauroyl peroxide;

benzoyl peroxide.

Peroxydicarbonates

Di(n-propyl) peroxydicarbonate; di(isopropyl)peroxydicarbonate; isopropyl sec-butyl peroxydicarbonate; di-(4-5-butyl cyclohexyl) peroxydicarbonate;

di(sec-butyl)peroxydicarbonate;

di(2-ethylhexyl)peroxy-
dicarbonate.

Peroxyesters

1,1-dimethyl-3-hydroxybutyl peroxyneoheptanoate; α-cumyl peroxyneodecanoate; α-cumyl peroxyneoheptanoate; α-cumyl peroxypivalate; t-amyl peroxyneodecanoate; t-butyl peroxyneodecanoate; t-amyl peroxypivalate; t-butyl peroxypivalate; 1,1-dimethyl-3-hydroxybutyl peroxy-2-ethylhexanonate; 2,5-dimethyl-2,5-di(2-ethylhexanoyl peroxy)hexane; t-amyl peroxy-2-ethylhexanoate; t-butyl peroxy-2-ethylhexanoate; t-butyl peroxy-isobutyrate; t-butyl peroxymaleic acid; OO-t-butyl O-isopropyl mono peroxycarbonate; 2,5-dimethyl-2,5-dimethyl-2,5-di(benzoylperoxy)hexane; OO-t-butyl O-(2-ethylhexyl) mono peroxycarbonate; OO-t-amyl O-(2-ethylhexyl) mono peroxycarbonate; t-butyl peroxyacetate; t-amyl peroxyacetate; di-t-butyl diperoxyphthalate; bis(3,5,5-trimethylhexanoyl) peroxide; t-butyl peroxyisopropyl carbonate; t-butyl peroxy-2-methylbenzoate;

t-butyl peroxybenzoate;

t-amyl peroxybenzoate;

t-butyl peroxyoctoate.

In general, radiation-induced polymerization of polyurethane precursors with an ionic salt of an organometallic complex cation and a hydroperoxide or acyl peroxide can be carried out at room temperature for the majority of polyurethane precursors, although low temperature (e.g., −10° C.) or elevated temperature (e.g., 30° to 200° C., preferably 50° to 150° C.) can be used to subdue the exotherm of polymerization or to accelerate the polymerization, respectively. In the case of latent catalysts of this invention, temperatures generally in the range of −20° to 250° C., preferably from 10° to 150° C., can be used. Temperature of polymerization and amount of catalyst will vary and be dependent on the particular polyurethane precursors used and the desired application of the polymerized or cured product.

The amount of ionic salt of an organometallic complex cation to be used as a catalyst in this invention should be sufficient to effect polymerization of the polyurethane precursors (i.e., a catalytically-effective amount) under the desired use conditions. Such amount generally will be in the range of about 0.01 to 20 weight percent, preferably 0.1 to 5.0 weight percent, and most preferably 0.1 to 2.0 weight percent, based on the weight of polyurethane precursors.

The peroxide component can be present in the range from 0.01 to 20, preferably 0 1 to 5 weight percent, of the total resin. The bicomponent curing agent can be present in an amount in the range of 0.02 to 25 weight percent of the total resin (polymeric precursors).

Preferably, the polymerizable composition is free of solvents. However, solvents, preferably organic, can be used to assist in solution of the photoinitiator system in the polyurethane precursors and acrylate monomers, and as a processing aid. It may be advantageous to prepare a concentrated solution of the organometallic complex salt in a small amount of solvent to simplify the preparation of the photopolymerizable composition. Representative solvents include propylene carbonate, acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme). In some applications, it may be advantageous to sorb the photoinitiator onto an inert support such as silica, alumina, or clays, as described in U.S. Pat. No. 4,677,137, which is incorporated herein by reference. Preferably, the photoinitiator system is dissolved in the polyol that has been warmed to about 50° C. to 60° C., thus eliminating the need for even a small amount of solvent For those compositions of the invention which are radiation-sensitive, i.e., the compositions containing polyurethane precursors and an ionic salt of an organometallic complex cation of Formula III or IV, any source of radiation including electron beam radiation and radiation sources emitting active radiation in the ultraviolet and visible region of the spectrum (e.g., about 200 to 800 nm) can be used. For highly filled compositions it is preferable to work in the visible range (350–800 nm). Suitable sources of radiation include mercury vapor discharge lamps, carbon arcs, tungsten lamps, xenon lamps, halogen lamps, sunlight, lasers, etc. The required amount of exposure to effect polymerization is dependent upon such factors as the identity and concentration of the ionic salt of the organometallic complex cation and the concentration of the peroxide co-catalyst, the particular polyurethane precursors, the thickness of the exposed material, type of substrate, intensity of the radiation source and amount of heat associated with the radiation.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity, allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, Steven L. Murov, Handbook of Photochemistry, Marcel Dekker Inc., N.Y., 27–35 (1973), and include pyrene, fluoroanthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer or photoaccelerator per part of organometallic salt.

It is within the scope of this invention to include two-stage polymerization (curing), by first activating the initiator of Formulae III and IV by irradiating the curable compositions and subsequently heat-curing the activated precursors so obtained, the irradiation temperature being below the temperature employed for the subsequent heat-curing These activated precursors may normally be cured at temperatures which are substantially lower than those required for the direct heat-curing, with advantage in the range from 50° to 110° C. This two-stage curing also makes it possible to control the polymerization in a particularly simple and advantageous manner. Optionally, the compositions may be cured in air and then irradiated in light under $N_2$ atmosphere to eliminate residual ethylenically-unsaturated monomers, if present. The composition should be kept in low light, or preferably in total darkness, until ready for coating onto a substrate and photopolymerization. The coating also can be irradiated in the supply line to the application device.

The coating and overcoating compositions may be applied to a substrate by dipping, brushing, spraying, knife coating, bar coating, painting, reverse roll, knurled roll, spin-coating, or by any other suitable coating method. Coating thickness of the overcoating composition depends on the use of the desired paint or coating. The practical upper and lower limits of thickness of the paint or coating depend on the nature of its formulation and requires that the resultant paint or coating retain its integrity after curing.

Curing of the overcoating composition can be accomplished in situ by employing any energy source appropriate to the specific monomer or monomers present.

When ethylenically-unsaturated materials are present, it is advantageous to use oxygen scavengers to improve air cure of compositions of the present invention. Typical oxygen scavengers include but are not limited to: isopropylamine, phenethylamine, N,N-dimethyl m-toluidine, N,N-dimethyl p-toluidine, triethylamine, monoethanolamine, diethanolamine, triethanolamine, N-methyl diethanolamine, triethylene diamine, ethyl 4-dimethylaminobenzoate, diethylene triamine, N,N-dimethylaminoethyl (meth)acrylate, and oligomeric compositions which contain amines in the backbone and may or may not have another functionality present such as Uvecryl TM 7100, Uvecryl TM P-115, and Uvecryl TM P-104 (all three from Radcure Specialties, Inc., Louisville, Ky.), and other oxygen scavengers known to those skilled in the art.

Adjuvants may be added to the compositions such as colorants, stabilizers, light stabilizers, antioxidants, flow agents, bodying agents, flatting agents, hiding pigments, inert fillers, binders, blowing agents, fungicides, bactericides surfactants, plasticizers, and other additives known to those skilled in the art. These adjuvants, if present, are added in an amount effective for their intended purpose.

Suitable substrates for use with compositions of the present invention include for example, metals (for example, aluminum, copper, cadmium, zinc, nickel, silver), ceramics, glass, paper, wood, various thermoplastic or thermoset films (for example, polyethylene terephthalate, plasticized polyvinyl chloride, polypropylene, polyethylene), cloth, and cellulose acetate.

Polymerizable compositions of the present invention are particularly useful as high performance, low VOC (volatile organic compounds) paints useful in the transportation and maintenance paint markets.

Advantageously, the present invention can be provided as a kit for preparing a latently curable paint composition having component packages capable of being mixed when the composition is to be applied, said kit comprising the combination of first and second packages wherein the polyol and polyisocyanate components are in separate packages. In one preferred embodiment, the kit comprises a mixture of polyol, free-radically polymerizable compound, the organometallic salt in one package, and a mixture of polyisocyanate and peroxide of the invention in the second package. In another preferred embodiment, the kit comprises a mixture of polyol and peroxide of the invention in one package and a mixture of polyisocyanate and free-radically polymerizable compound and organometallic salt in the second package. A preferred two-package paint kit comprises: in one package, polyol, free-radically polymerizable compound, pigment, adjuvants as for coloring, flatting, hiding, etc., oxygen scavenger, organometallic salt, and optionally solvents; and in a second package, polyisocyanate and peroxides of the invention.

Objects and advantages of this invention are further illustrated by the following examples, but the particular materials and amounts thereof recited in these examples, as well as other conditions and details, should not be construed to unduly limit this invention.

EXAMPLE 1

This example shows the ability of the present invention bicomponent curing agent to reduce the time necessary to cure polyurethane precursors to a tack-free condition.

The polymerizable composition consisted of the polyol (46.50 g Desmophen TM 670-100 (Polyol A) or 22.43 g Desmophen TM 800 (Polyol B)), and 23.50 g polyisocyanate (Desmodur N-100 TM), (all available from Miles, Pittsburgh, Pa.), 1.00 g of a 25% solution of mixture of isomers of (eta$^6$-xylenes) (eta$^5$-cyclopentadienyl)iron(1+)hexafluorophosphate (CpFeXylPF$_6$, prepared as described in U.S. Pat. No. 5,059,701) in propylene carbonate. Two samples were made of each formulation and 0.60 g methyl ethyl ketone peroxide (MEKP), available from Atochem, Buffalo, N.Y., was added to one while the other was cured without peroxide.

Aluminum test panels (Q-Panel TM, Cleveland, Ohio) were coated using a 76.2 micrometers (3 mil) knife coater and cured under Super Diazo Blue TM lamps (Sylvania, Danvers, Mass.). The "minutes to tack-free" was determined by cotton ball test at various exposure times, in which a cotton ball is placed on the coating and removed without leaving a smear or any cotton fiber behind, as determined visually. The data are shown in Table 1, below.

TABLE 1

| | Cure Speed Data | |
| --- | --- | --- |
| Exposure Time | Polyol Formulation | Condition |
| 2 min. | polyol A (comparative) | wet |

TABLE 1-continued

Cure Speed Data

| Exposure Time | Polyol Formulation | Condition |
|---|---|---|
| | polyol A, MEKP | wet |
| | polyol B (comparative) | wet |
| | polyol B, MEKP | tacky |
| 3 min. | polyol A (comparative) | tacky |
| | polyol A, MEKP | light tack |
| | polyol B (comparative) | light tack |
| | polyol B, MEKP | tack free |
| 5 min. | polyol A (comparative) | tacky |
| | polyol A, MEKP | tack-free, cured |
| | polyol B (comparative) | tack-free, heavy skin, wet at substrate |
| | polyol B, MEKP | tack-free, cured through |

Data of Table 1 show the decrease in tack-free time of composition of the present invention compared to those without peroxide curative.

The same formulations were also cured under Quartz/Halogen lights (Sylavnia, Danvers, Mass.) as 76.2 micrometers (3 mil) films on aluminum panels. Panels were exposed for either 5 minutes or 10 minutes and pencil hardness (ASTM 3363-74) was checked within ten minutes after removal from the lights. Data are shown in Table 2, below.

TABLE 2[a,b]

Pencil Hardness Data

| Formulation | 5 min. exposure | 10 min. exposure |
|---|---|---|
| polyol A (comparative) | Wet | 4B |
| polyol A, MEKP | <6B | 2B |
| polyol B (comparative) | <6B | 2B |
| polyol B, MEKP | 2B | F |

[a] pencil hardness refers to the hardest pencil that will not cut the film
[b] order of hardness, from softest to hardest: 6B-5B-4B-3B-2B-B-HB-F-H-2H-3H-4H-5H-6H. This scale is used also in Examples 2 and 3.

Data of Tables 1 and 2 above show that addition of peroxide improved tack-free time and pencil hardness of the resulting polyurethane.

EXAMPLE 2

Curing trials were conducted to establish a differentiation between the classes of peroxides. Aluminum panels were coated with a 76.2 micrometer (3 mil) knife coater and exposed to Super Diazo Blue lamps at a distance of 20.3 cm (8 inches). All samples received a total of 45 minutes exposure. The 'minutes to tack-free' was determined by cotton ball test as defined in Example 1. Additionally, pencil hardness was measured after 24 hours of post cure.

The formulation used for this test was 12.14 g Polyol B (Desmophen 800), 12.61 g polyisocyanate (Desmodur N-100), 0.25 g of a 25% solution of CpFeXylPF$_6$ in propylene carbonate and 0.0182 equivalents of active oxygen provided by peroxide. Data are shown in Table 3, below.

TABLE 3

Tack-Free and Pencil Hardness Data

| | Min. to tack-free | 24-hour[a] hardness |
|---|---|---|
| methyl ethyl ketone peroxide (DDM-9 TM (Atochem, Buffalo, NY) | 12 | 2H |
| t-butyl peroxybenzoate (Trigonox TM "C", Noury Chemicals, Chicago, IL) | 17 | 3H |
| di-t-butyl peroxide | 44 | HB |

TABLE 3-continued

Tack-Free and Pencil Hardness Data

| | Min. to tack-free | 24-hour[a] hardness |
|---|---|---|
| (Trigonox "B", Noury Chemicals) (comparative) | | |
| t-butyl cumyl peroxide (Trigonox "T", Noury Chemicals) (comparative) | 41 | F |
| 1-1-Di-t-butyl peroxy 3,3,5-trimethyl cyclohexane (Trigonox "29 ", Noury Chemicals) (comparative) | 41 | F |
| cyclohexanone hydroperoxide (LE-50 TM, Noury Chemicals) | 12 | 2H |
| cumene hydroperoxide (cumene hydroperoxide, Atochem) | 12 | 2H |
| No peroxide (comparative) | 24 | B |

[a] scale is the same as in Table 2

Data of Table 3 show the classes of peroxides within the present invention enhance cure to provide polyurethanes whereas others hinder curing to provide polyurethanes. In addition, this example shows that as cure speed is increased, pencil hardness also improves.

EXAMPLE 3

This example demonstrates the advantage of peroxides disclosed in the present invention over onium salts and benzoin ethers which are known in the art. A stock solution was made using 343.05 g Desmophen 800, 10.50 g dispersing agent (Solsperse TM 24000, Imperial Chemical Industrials, PLC, Manchester, England), 87.75 g phenoxyethyl acrylate (Sartomer, Stratford, Conn.), and 525.00 g TiO$_2$ (Dupont, Wilmington, Del.). This stock solution was dispersed using a high speed dispersion blade on an air mixer to a fineness of grind of Hegman #7 (particle size of at most 12 micrometers).

The formulation used to make samples consisted of 30.00 g stock solution, 2.72 g tripropylene glycol diacrylate, 3.63 g phenoxyethyl acrylate, 0.30 g of a 25% solution of CpFeXylPF$_6$ in propylene carbonate, and 10.54 g Desmodur N-100. Individual samples were prepared by adding 0.18 g of methyl ethyl ketone peroxide (MEKP), diphenyl iodonium hexafluorophosphate salt (Ph$_2$IPF$_6$) (as disclosed in U.S. Pat. No. 4,256,828, col. 7, lines 34–41), or benzildimethyl ketal (KB-1 TM (Sartomer)). A fourth sample was made without a free radical initiator to use as a control.

Coated aluminum panels were prepared with a 76.2 micrometers (3 mil) knife coater and the panels were irradiated with Super Diazo Blue lamps for 15 minutes at a distance of 5 cm. The samples were allowed to post cure for 1.5 hours at room temperature before testing for hardness and chemical resistance. Data are shown in Table 4, below.

TABLE 4

Pencil Hardness and Chemical Resistance

| | MEKP | Ph$_2$IPF$_6$ (comparative) | KB-1 (comparative) | no free radical source (comparative) |
|---|---|---|---|---|
| Pencil Hardness | 4B | <6B | <6B | <6B |
| MEK double rubs ASTM 4752-87 | >200 | 70 | 20 | 80 |

Data of Table 4 show the advantages of the curing agent of the present invention in providing film hardness and chemical resistance over similar prior art compositions using organometallic salts with onium salts or benzoin ethers.

EXAMPLE 4

This example shows the advantage of using the present invention bicomponent curing agent over using of organometallic salts with either onium salts or benzoin ethers as to cure speed of polyurethane precursors.

The formulation and cure conditions used were the same as those in Example 2. All the peroxides used were fresh samples from Atochem. Data are shown in Table 5, below.

TABLE 5

| Free radical | % active oxygen[a] | Min. to tack-free |
|---|---|---|
| hydroperoxides: | | |
| cumene hydroperoxide | 8.20 | 12 |
| t-butyl hydroperoxide | 15.98 | 13 |
| cyclohexanone hydroperoxide | 5.20 | 12 |
| 2,4-pentanedione peroxide | 4.00 | 15 |
| methyl ethyl ketone peroxide | 8.70 | 13 |
| dialkyl peroxides: (comparative) | | |
| di-t-butyl peroxide | 10.80 | >45 |
| t-butyl comyl peroxide | 6.91 | >45 |
| peroxyketals: (comparative) | | |
| 1,1-di(t-butylperoxy)3,3,5-trimethyl cyclohexane | 9.73 | >45 |
| ethyl-3,3-di(t-butylperoxy) butyrate | 8.21 | 45 |
| peroxydicarbonates: | | |
| di(2-ethylhexyl) peroxy-dicarbonate | 3.48 | 12 |
| di(sec-butyl) peroxy-dicarbonate | 4.10 | 14 |
| peroxyesters: | | |
| t-amyl perbenzoate | 7.30 | 15 |
| t-butyl perbenzoate | 8.07 | 14 |
| 5-butyl octoate | 7.39 | 15 |
| Onium salt: | | |
| $Ph_2IPF_6$ (comparative) | — | 35 |
| Benzoin ether: | | |
| benzildimethyl ketal (comparative) | — | 42 |
| No free radical source (comparative) | — | 32 |

[a]percent active oxygen provided by peroxide (available from Atochem)

Data of Table 5 show the improved cure speed of compositions of the invention. Additionally, the example defines which classes of peroxides are beneficial to the invention as follows: hydroperoxides, ketone peroxides, peroxydicarbonates and peroxyesters. These all enhance the cure of polyurethane precursors whereas dialkyl peroxides, peroxyketals, onium salts and benzoin ethers can inhibit cure.

EXAMPLE 5

Figure 1:
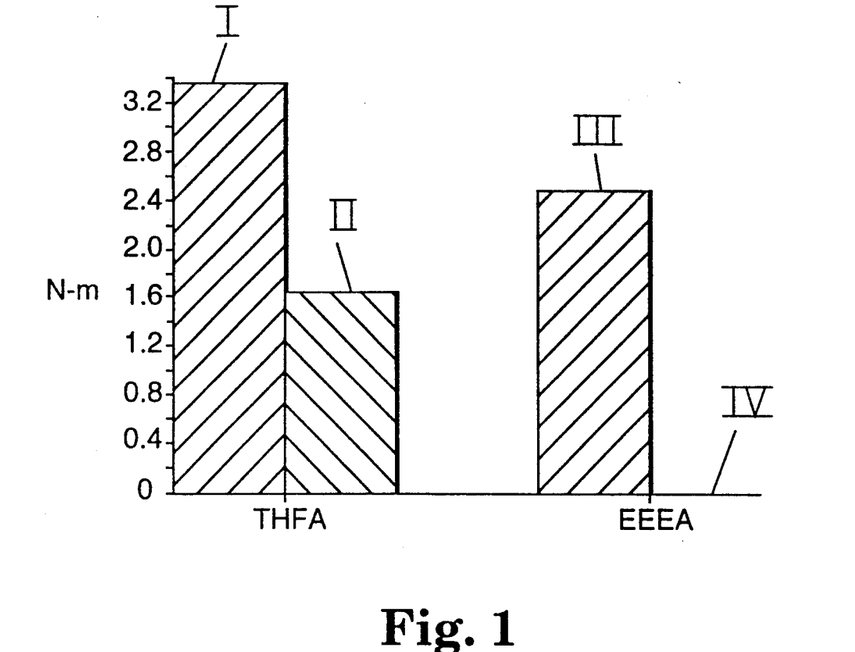
FIG. 1 is a bar graph showing energy to break data (Newton-meters) in tensile evaluations.
Figure 2:
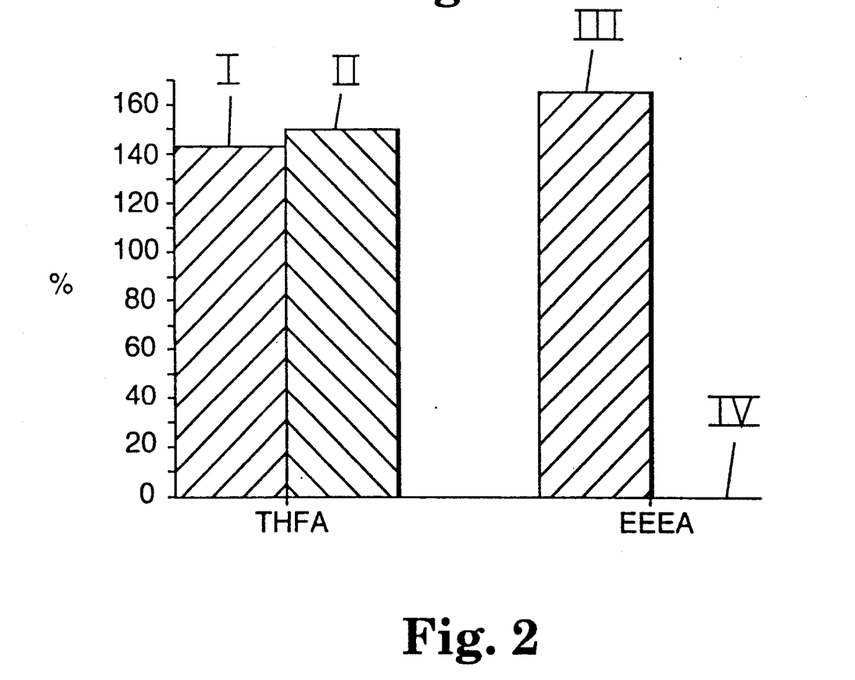
FIG. 2 is a bar graph showing percent elongation to break in tensile evaluations.
Figure 3:
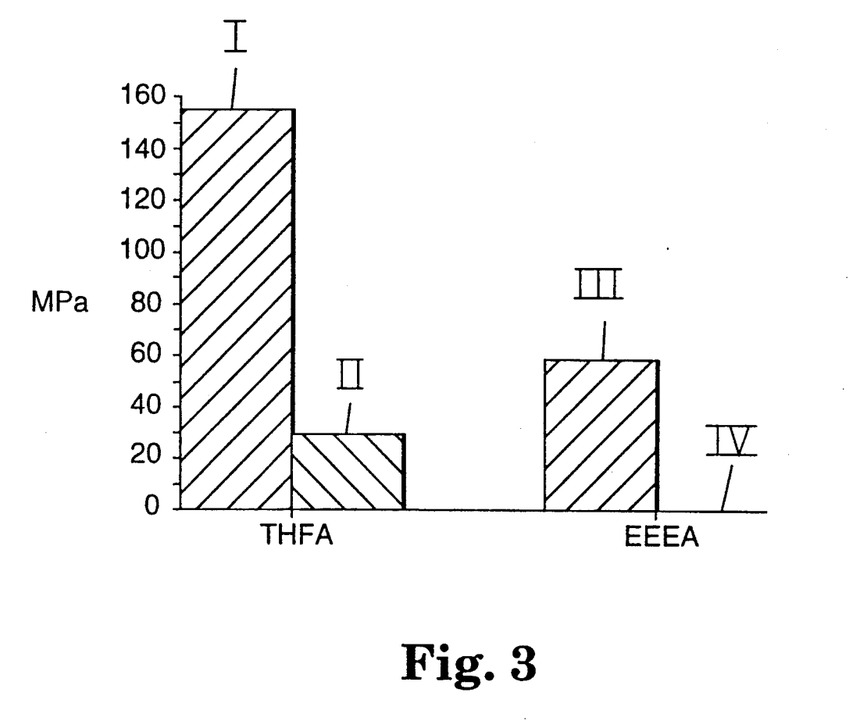
FIG. 3 is a bar graph showing tangent modulus data (megaPascals).

This example shows the improvement in physical properties of the compositions of the present invention compared to those using benzoin ethers as curative for polyurethane precursors. The compositions consisted of (a) 140.35 g Desmophen 670-100, (b) 41.30 g isophorone diisocyanate (Aldrich Chemical Co., Milwaukee, Wis.), (c) 65.50 g hexanediol diacrylate (HDDA) (Sartomer, Stratford, Conn.), (d) 0.55 g of a 25% solution of CpFeXylPF6 in butyrolactone, (e) 1.87 g of methyl ethyl ketone peroxide (MEKP) or (f) benzildimethyl ketal (Irgacure TM 651, Ciba-Geigy, Hawthorne, N.Y.), and (g) 28.07 g of tetrahydrofurfuryl acrylate (THFA) (Sartomer, Stratford, Conn.) or (h) 31.88 g of 2-(2-ethoxyethoxy)ethyl acrylate (EEEA) (Sartomer, Stratford, Conn.). Composition I contained components (a), (b), (c), (d), (e), and (g). Composition II (comparative) contained components (a), (b), (c), (d), (f), and (g). Composition III contained components (a), (b), (c), (d), (e), and (h). Composition IV (comparative) contained components (a), (b), (c), (d), (f), and (h). All samples were prepared in dumbbell shaped forms that were cut using an ASTM D 638-89 type IV die. The cure used was 15.2 m/min. (50 fpm) in air using normal power settings on a UV processor followed by a 100° C. oven overnight. Instron tensile tests using a Model 1122 tester (Instron, Canton, Mass.) were performed on the resultant cured samples the next day. Energy to break, percent elongation at break, and tangent modulus were determined. Data are shown in FIGS. 1, 2, and 3. Samples containing Irgacure 651, component (f), (composition II and IV) are comparative.

Note: The EEEA/Irgacure 651 samples (compositions IV in FIGS. 2 and 3) appear to be missing. This is, in fact, an accurate representation of the sample which had no structural integrity.

Data of FIG. 1 show the improvement in energy to break when a specified peroxide was used compared to use of benzildimethyl ketal (Irgacure 651). The EEEA formulation with Irgacure 651 (IV) had a break energy of zero while the same formulation with MEKP (III) had a break energy of 2.5 N-m. When THFA was used, the Irgacure 651 formulation (II) improved to a break energy of 1.6 N-m while the MEKP formulation (I) improved to 3.3 N-m.

Values for elongation to break, as shown in FIG. 2, of 143.1% (I) and 166.6 % (III) for the formulations containing MEKP indicate comparable flexibility to the THFA/Irgacure 651 sample of 150.4% (II) and show that the increased toughness and hardness of the composition had not been at the expense of flexibility.

FIG. 3, depicting tangent modulus values, indicates the advantage of compositions prepared using the present invention. The EEEA formulation combined with Irgacure 651 (IV) had a value of zero MPa while the MEKP version of the same formulation (III) was 57.9 MPa. The THFA formulation provides a direct comparison because the Irgacure 651 sample (II) was cured well enough to give a value. That value was, however, only 29.0 MPa versus a value of 155.2 MPa for the MEKP version (I) of the same formulation.

Data of FIGS. 1, 2, and 3 show the improved physical properties of break energy and tangent modulus without giving up elongation when comparing the curing agent of the present invention with a curing agent containing organometallic salt and benzoin ether.

EXAMPLE 6

This example shows the improved cure speed of polyurethane precursors by themselves and with acrylate monomers using the present invention. A DuPont model 930 Photo Differential Scanning Calorimiter (PDSC) was used to measure the enthalpy of the irradiated compositions. Two samples were prepared using 13.17 g Desmophen 670-100, 2.98 g ethoxyethoxy ethyl acrylate, 5.80 g hexanediol diacrylate, 0.11 g of a 25% solution of CpFeXylPF6 in butyrolactone and 6.77 g Desmodur N-3300 (formulation A). One sample was catalyzed with 0.17 g MEKP and the other sample was catalyzed with 0.07 g Irgacure 651. Two additional samples were prepared as described above but without the ethoxyethoxyethyl acrylate or the hexanediol diacrylate (formulation B).

Formulation A and formulation B samples were exposed in the PDSC for 5 minutes at 40° C.

Data are shown in Table 6, below.

TABLE 6

|  | ENTHALPY J/g |
|---|---|
| formulation A | |
| Irgacure 651 (comparative) | 175.2 |
| MEKP | 239.9 |
| formulation B | |
| Irgacure 651 (comparative) | 2.6 |
| MEKP | 68.7 |

By comparison of the enthalpies, it can be observed that the sample with MEKP had an enthalpy of 239.9 J/g whereas the Irgacure 651 sample had an enthalpy of only 175.2 J/g, a difference of 64.7 J/g greater with peroxide.

To determine whether or not the increased enthalpy using MEKP was a result of acrylate reactivity or polyurethane precursors reactivity, samples of formulation B were catalyzed with either MEKP or Irgacure 651 as described above and run on a PDSC. The enthalpy of the peroxide cured system was 68.7 J/g but the enthalpy of the Irgacure 651 sample was only 2.6 J/g, indicating that there was virtually no interaction between the Irgacure 651 and the polyurethane precursors. Again, as in formulation A, the increase in enthalpy was about 65 J/g.

This example teaches the improved cure speed of the polyurethane precursors (B) and polyurethane precursors with acrylates (A) when cured with a latent organometallic catalyst and methyl ethyl ketone peroxide compared to the same formulations cured with a latent organometallic catalyst and a conventional free radical source.

EXAMPLE 7

This example demonstrates the low volatile organic compounds (VOC) generated using a peroxide free-radical source versus an onium salt or a benzoin ether. Aluminum panels were painted using a 76.2 micrometer (3 mil) knife coater and exposed to Super Diazo Blue lamps for 15 minutes at a distance of 5 cm.

The paint formulation used consisted of 17.75 g Desmophen 800, 0.54 g Solsperse ™ 3000 (Imperial Chemical Industries, PLC, Manchester, England), 27.16 g titanium dioxide, 4.54 g hexanediol diacrylate, 10.60 g tetrahydrofurfuryl acrylate, 0.51 g of a 25% solution of CpFeXylPF$_6$ in propylene carbonate, 17.56 g Desmodur N-100 and 0.04 g of a flow aid (Coroc A-620-A2, Cook Composites and Polymers, Port Washington, Wis.). The free radical source was 0.30 g of one of the following: methyl ethyl ketone peroxide (MEKP), benzil dimethyl ketal (KB-1), or triphenylsulfonium hexafluoroantimonate (Ph$_3$SSbF$_6$) Five panels were prepared wherein the free radical source was MEKP, five panels wherein the free radical source was KB-1, and five panels wherein the free radical source was Ph$_3$SSbF$_6$ (Union Carbide, Danbury, Conn.).

The aluminum panels were weighed before coating, then the paint was applied and the panels were weighed again. The coated panels were cured under the conditions described above in this Example and allowed to post cure for 24 hours at room temperature. They were then placed in a 110° C. oven for one hour. After removing from the oven, the panels were weighed again to determine the total weight loss. Results are shown in Table 7, below.

TABLE 7

|  | Panel Wt. | Wet Wt. | After Oven Wt. | % VOC by Wt. | Average % VOC |
|---|---|---|---|---|---|
| | | | MEKP | | |
| 1 | 15.6267 | 16.2521 | 16.2047 | 7.08 | |
| 2 | 15.6980 | 16.4014 | 16.3464 | 7.32 | |
| 3 | 15.8230 | 16.5031 | 16.4523 | 6.97 | 7.12 |
| 4 | 15.9016 | 16.5263 | 16.4790 | 7.07 | |
| 5 | 15.8704 | 16.4843 | 16.4372 | 7.17 | |
| | | | KB-1 | | |
| 1 | 15.7757 | 16.4409 | 16.3035 | 20.16 | |
| 2 | 15.8461 | 16.5091 | 16.3737 | 19.92 | |
| 3 | 15.8954 | 16.5317 | 16.4015 | 19.96 | 20.02 |
| 4 | 15.9456 | 16.3710 | 16.4412 | 20.01 | |
| 5 | 15.9177 | 16.5766 | 16.4412 | 20.05 | |
| | | | Ph$_3$SSbF$_6$ | | |
| 1 | 15.7704 | 16.3204 | 16.2107 | 19.45 | |
| 2 | 15.6889 | 16.2978 | 16.1767 | 19.39 | |
| 3 | 15.6487 | 16.3287 | 16.1930 | 19.46 | 19.36 |
| 4 | 15.6968 | 16.3710 | 16.2375 | 19.30 | |
| 5 | 15.9177 | 16.4397 | 16.3054 | 19.19 | |

Data of Table 7 show the advantage of the present invention curing agent over organometallic salts with onium salts or benzoin ethers in the preparation of low VOC coatings and films.

EXAMPLE 8

This example shows the improved acrylate conversion (% converted to polymer) using an oxygen scavenger when a formulation containing polyurethane precursors and ethylenically-unsaturated compounds is cured in air using the bicomponent curing agent of the present invention.

A paint was prepared having the following formulation: 192.26 g polyol (Desmophen 800), 10.39 g dispersant (Solsperse 24,000), 84.34 g tetrahydrofurfuryl acrylate, 521.34 g titanium dioxide (R-960, DuPont), 165.04 g polyol (Desmophen 651A-65, Miles, Pittsburgh, Pa.), 201.81 g hexanediol diacrylate, 0.30 g of a 25% solution of CpFeXylPF$_6$ in butyrolactone, 310.51 g polyisocyanate (Desmodur N-100), and 5.12 g methylethyl ketone peroxide. Two aliquots of 46.26 g each were taken and adjusted as follows:

| Sample A | no oxygen scavenger added |
|---|---|
| Sample B | 2.3 g. oligomeric tertiary amine (Uvecryl ™ 7100, Radcure Specialties, Inc., Louisville, KY) |

Five test panels of each sample were prepared by using a 76.2 micrometer (3 mil) knife coater on aluminum panels and cured 15 minutes under Super Diazo Blue lamps at a distance of 5 cm. Solids loss was calculated by measuring % VOC and subtracting % solvent to determine % solids lost. VOC was determined by the manner described in Example 7. The solids lost were credited to the acrylate monomers because of their low molecular weight and relatively high vapor pressure. Results were as follows:

| SAMPLE | % ACRYLATE CONVERSION |
|---|---|
| A | 55.7 |

| SAMPLE | % ACRYLATE CONVERSION |
|---|---|
| B | 86.2 |

Addition of oxygen scavenger Uvecryl 7100 improved acrylate conversion of Sample B compared to Sample A.

Various modifications and alterations of this invention will become apparent to those skilled in the art without departing from the scope and spirit of this invention, and it should be understood that this invention is not to be unduly limited to the illustrative embodiments set forth herein.

I claim:

1. A polymerizable composition comprising a polymeric precursor as disclosed in (1) or (2) wherein
   (1) comprises at least one polyisocyanate, and at least one compound bearing at least two isocyanate-reactive hydrogen atoms, the isocyanate and reactive hydrogen-containing compound constituting polyurethane precursors, or
   (2) comprises at least one ethylenically-unsaturated monomer, at least one polyisocyanate, and at least one compound bearing at least two isocyanate-reactive hydrogen atoms, the isocyanate and reactive hydrogen-containing compound constituting polyurethane precursors, and a two-component curing agent for (1) or (2) comprising an ionic salt of an organometallic complex cation comprising at least one transition metal atom and at least one carbon to metal atom bond, and a peroxide selected from the group consisting of hydroperoxides and acyl peroxides, wherein said polymerizable composition, when subjected to sufficient energy to effect polymerization, provides a tack-free cured composition.

2. The composition according to claim 1 wherein said peroxide has the formula wherein
   $R^1$ and $R^2$ independently represent hydrogen or an organic group selected from the class consisting of (1) straight chain or branched aliphatic hydrocarbon group containing 1 to 50 carbon atoms and zero to 20 heteroatoms, (2) cycloaliphatic hydrocarbon group containing 2 to 50 carbon atoms and zero to 20 heteroatoms, (3) aromatic hydrocarbon group or heterocyclic aromatic group containing 3 to 15 carbon atoms and zero to 10 heteroatoms, (4) araliphatic hydrocarbon group containing 6 to 50 carbon atoms and zero to 20 heteroatoms, or (5) alkoxy groups having 1 to 50 carbon atoms and zero to 20 heteroatoms; wherein the heteroatoms that are present in $R^1$ and $R^2$ are those that do not interfere with the overall efficacy of the composition,
   m and n independently are 0 or 1, and
   w is an integer in the range of 1 to 4,
   with the provisos that when both $R^1$ and $R^2$ are an organic group, then m+n is equal to 1 or 2, and when $R^1$ is alkoxy, m=1, and when $R^2$ is alkoxy, n=1.

3. The composition according to claim 1 which is at least one of photopolymerizable, accelerated particle polymerizable, and thermally polymerizable.

4. The composition according to claim 1 wherein said ionic salt of an organometallic complex cation is an organometallic iron salt.

5. The composition according to claim 4 wherein said salt is present in an amount in the range of 0.01 to 20 weight percent of said polymeric precursors.

6. The composition according to claim 1 wherein said peroxide is present in an amount in the range of 0.01 to 20 weight percent of said polymeric precursor.

7. The composition according to claim 1 which has been subjected to sufficient energy to effect polymerization and provide a cured composition.

8. The composition according to claim 1 wherein said polyurethane precursor is at least one polyisocyanate and at least one polyol.

9. The composition according to claim 1 wherein said polyisocyanate has the formula $$Q(NCO)_p$$

wherein
   p=an integer in the range of 2 to 4 and
   Q=represents an aliphatic hydrocarbon radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 6 to 15 carbon atoms and zero to 10 heteroatoms, or an araliphatic hydrocarbon radical containing from 8 to 100 carbon atoms and zero to 50 heteroatoms, wherein the heteroatoms in all of the radicals are selected from the group consisting of non-peroxidic oxygen, sulfur, non-amino nitrogen, halogen, silicon, and non-phosphino phosphorus.

10. The composition according to claim 1 wherein said ethylenically-unsaturated monomer is selected from the group consisting of at least one of mono- or polyfunctional (meth)acrylates, (meth)acrylamides, vinyl compounds, allyl compounds, allyl ether compounds, and bireactive monomers containing a free radically polymerizable group and one of an isocyanate and an isocyanate reactive group.

11. The composition according to claim 10 wherein the weight ratio of said mono- and polyfunctional acrylates are in the range of 0.1:99.9 to 99.9:0.1.

12. The composition according to claim 1 wherein said ionic salt of an organometallic complex cation has the formula:

$$[((L^1)(L^2)M)_b(L^3)(L^4)]^{+e}X_f \qquad \text{III}$$

wherein M represents the same or different metals selected from the elements of Periodic Groups 4 to 10, with the proviso that Formula III can represent an organometallic salt having a mono- or bimetallic cation;
   $L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none or 1 to 6 ligands contributing an even number of sigma-electrons that can be the same or different selected from mono-, di-, and tri-dentate ligands, each contributing 2, 4, or 6 sigma-electrons to the valence shell of M;

$L^3$ represents none, 1 or 2 bridging ligands pi-electrons that can be the same or different ligand selected from substituted or unsubstituted acyclic and cyclic unsaturated compounds and groups and substituted and unsubstituted carbocyclic aromatic and heterocyclic aromatic compounds, each capable of acting as a bridging ligand contributing 2 to 24 pi-electrons to the valence shells of two metal atoms simultaneously;

$L^4$ represents none, 1, 2 or 3 bridging ligands contributing an even number of sigma-electrons that can be the same or different selected from mono, di, and tri-dentate ligands, each donating 2, 4, or 6 sigma-electrons to the valence shells of two M simultaneously;

with the proviso that the total electronic charge contributed to M by the ligands $L^1$, $L^2$, $L^3$ and $L^4$ plus the product of ionic charge on M with b results in a residual net positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer of 1 or 2, the number of anions required to neutralize the charge e on the cation.

13. The composition according to claim 1 wherein said peroxide is a hydroperoxide.

14. The composition according to claim 1 wherein said peroxide is an acyl peroxide.

15. The composition according to claim 1 which is a paint.

16. The composition according to claim 1 further comprising an effective amount of a photosensitizer.

17. A coated article comprising the cured composition according to claim 7.

18. A layered structure comprising a substrate having coated on at least one surface thereof the polymerizable composition according to claim 1.

19. A method comprising the steps of:
(a) providing a mixture comprising a polymeric precursor composition selected from the group consisting of
  (1) at least one polyisocyanate, and at least one compound bearing at least two isocyanate-reactive hydrogen atoms, the isocyanate and reactive hydrogen-containing compound constituting polyurethane precursors, and
  (2) at least one ethylenically-unsaturated compound, at least one polyisocyanate, and at least one compound bearing at least two isocyanate-reactive hydrogen atoms, the isocyanate and reactive hydrogen-containing compound constituting polyurethane precursors, and a catalytically effective amount of a two-component curing agent for (1) or (2) comprising
  (1) an organometallic salt comprising at least one transition metal atom and at least one carbon to metal atom bond, and
  (2) a peroxide selected from the group consisting of hydroperoxides and acyl peroxides;

(b) allowing said mixture to polymerize or adding energy to said mixture to effect polymerization to provide a tack-free cured composition.

20. The method according to claim 19 wherein said energy is at least one of electromagnetic radiation, accelerated particles, or thermal energy.

21. The method according to claim 19 wherein polymerization is effected in two stages, the first stage involving radiation and the second step involving thermal cure.

22. The method according to claim 19 wherein said two-component curing agent is present in the range of 0.02 to 25 weight percent of said polymeric precursors.

23. A kit for preparing a latently curable composition according to claim 1 to provide a paint and being a two package kit, said packages being capable of being mixed when the composition is to be applied, said kit comprising the combination of first and second packages wherein said isocyanate reactive hydrogen-containing compound and said polyisocyanate are in separate packages.

24. The kit according to claim 23 wherein said first package comprises a mixture of isocyanate reactive hydrogen-containing compound, free-radically polymerizable compound, and said effective amount of said organometallic salt, and said second package comprises a mixture of polyisocyanate and an effective amount of said peroxide of the invention.

25. The kit according to claim 23 wherein said first package comprises a mixture of isocyanate reactive hydrogen-containing compound and an effective amount of said peroxide of the invention, and said second package comprises a mixture of polyisocyanate and free-radically polymerizable compound and an effective amount of said organometallic salt.

26. The kit according to claim 23 wherein said kit comprises: in one package, isocyanate reactive hydrogen-containing compound, free-radically polymerizable compound, pigment, adjuvants, oxygen scavenger, an effective amount of said organometallic salt, and optionally solvents; and in a second package, polyisocyanate, an effective amount of said peroxide of the invention, and optionally solvents.

* * * * *

UNITED STATES PATENT AND TRADEMARK OFFICE
CERTIFICATE OF CORRECTION

PATENT NO. : 5,212,210
DATED : May 18, 1993
INVENTOR(S) : Leo W. Halm

It is certified that error appears in the above-identified patent and that said Letters Patent is hereby corrected as shown below:

Col. 2, line 19, "material The" should read -- material. The --.

Col. 2, line 65, "adhesive These" should read -- adhesive. These --.

Col. 9, line 27, "reference The" should read -- reference. The --.

Col. 16, line 5, "preferably 01 to 5" should read -- preferably 0.1 to 5 --.

Col. 23, line 46, "I7.75g" should read --17.75 g--.

Col. 23, line 57, "($Ph_3SSbF_6$) Five" should read -- ($Ph_3SSbF_6$). Five --.

Signed and Sealed this

Fifteenth Day of February, 1994

Attest:

BRUCE LEHMAN

*Attesting Officer*      *Commissioner of Patents and Trademarks*